United States Patent
Tominaga (10) Patent No.: US 7,445,081 B2
(45) Date of Patent: Nov. 4, 2008

(54) ELECTRIC POWER STEERING APPARATUS

(75) Inventor: Tsutomu Tominaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 274 days.

(21) Appl. No.: 11/498,100

(22) Filed: Aug. 3, 2006

(65) Prior Publication Data

US 2007/0246289 A1    Oct. 25, 2007

(30) Foreign Application Priority Data

Apr. 21, 2006    (JP) .............................. 2006-118219

(51) Int. Cl.
*B62D 5/04*    (2006.01)
(52) U.S. Cl. .................................... 180/444
(58) Field of Classification Search ............... 180/444, 180/443
See application file for complete search history.

(56) References Cited

U.S. PATENT DOCUMENTS

| | | | |
|---|---|---|---|
| 6,695,091 B2 * | 2/2004 | Achenbach et al. | 180/444 |
| 6,989,616 B2 * | 1/2006 | Okubo et al. | 310/64 |
| 2005/0167183 A1 * | 8/2005 | Tominaga et al. | 180/444 |
| 2007/0144822 A1 * | 6/2007 | Tominaga et al. | 180/444 |
| 2007/0205038 A1 * | 9/2007 | Tominaga et al. | 180/444 |

FOREIGN PATENT DOCUMENTS

| | | |
|---|---|---|
| JP | 03-191591 | 8/1991 |
| JP | 07-297576 A | 11/1995 |
| JP | 08-213752 | 8/1996 |
| JP | 09-139580 | 5/1997 |
| JP | 2004-175355 | 6/2004 |
| JP | 3638269 B2 | 1/2005 |
| WO | WO-2000-65888 | 11/2000 |

* cited by examiner

*Primary Examiner*—Tony H. Winner
(74) *Attorney, Agent, or Firm*—Sughrue Mion, PLLC (57) ABSTRACT

In an electric power steering apparatus, a metal substrate and connector terminals arranged in a peripheral portion of the metal substrate are electrically connected to each other by metal elements, and conductor layers of the metal substrate and the metal elements are bonded to each other by laser welding, whereby the number of parts and a space for connection can be reduced.

12 Claims, 5 Drawing Sheets

ELECTRIC POWER STEERING APPARATUS

BACKGROUND OF THE INVENTION

1. Field of the Invention

The present invention relates to an electric power steering apparatus equipped with an electric motor for outputting assist torque to the steering wheel of a vehicle, and a control unit for controlling the driving of the electric motor.

2. Description of the Related Art

In the past, there has been known an electric power steering apparatus which is equipped with an electric motor for outputting assist torque to the steering wheel of a vehicle, and a control unit mounted on the electric motor for controlling the driving of the electric motor.

For example, in an electric power steering apparatus disclosed in a first patent document (Japanese patent No. 3,638,269), a metal substrate on which a bridge circuit comprising semiconductor switching elements for switching a current supplied to an electric motor is mounted, and a high current board having a conductive plate, a motor terminal and so on insert molded into an insulating resin are electrically connected to each other via a connecting member. Here, the connecting member is fixedly attached onto, and then soldered to, the metal substrate, and at the same time is electrically connected through welding with the conductive plate and the motor terminal of the high current board.

In addition, in a second patent document (Japanese patent application laid-open No. H7-297576), there is disclosed an arrangement in which a terminal having its one end embedded in a resin case that receives a circuit board and a leading terminal arranged on circuit wiring of the circuit board are connected with each other by a lead segment, and the terminal and the lead segment connected with the leading terminal are connected with deriving the terminal are connected with each other by laser welding is disclosed.

In the electric power steering apparatus as described in the above-mentioned first patent document, there is the following problem. That is, the connecting member is fixedly attached onto the metal substrate so as to prevent the connecting member from floating upon soldering thereof, and hence a sufficient area of the metal substrate is required for arrangement and tightening operation of screws for the attachment of the connecting member. In addition, an impact force generated when the connecting member is fixed onto the metal substrate is transmitted to the component parts of the bridge circuit before soldering thereof onto the metal substrate, so there occur positional shifts of such component parts.

Further, in the second patent document, the lead segment is connected with the circuit wiring of the circuit board via the leading terminal. As a result, there arises a problem that the apparatus becomes large in size, increased in the number of component parts and hence high in cost, as well as low in reliability of soldered connections of the parts mounted on the metal substrate.

SUMMARY OF THE INVENTION

Accordingly, the present invention is intended to obviate the problem as referred to above, and has for its object to provide an electric power steering apparatus which can be reduced in size and cost, and improved in reliability of electrical connections by decreasing the number of component parts that connect a metal substrate and connector terminals in a peripheral portion of the metal board.

Bearing the above object in mind, according to the present invention, there is provided an electric power steering apparatus including an electric motor for outputting assist torque to a steering wheel of a vehicle, and a control unit for controlling the driving of the electric motor. The control unit includes: a power main body including a bridge circuit composed of a plurality of semiconductor switching elements for switching a current supplied to the electric motor in accordance with torque assisting the steering wheel; a control main body that generates a drive signal to control the bridge circuit based on the steering torque of the steering wheel; a metal substrate that is composed of a plurality of insulating layers and a plurality of conductor layers having wiring patterns respectively formed thereon, the insulating layers and the conductor layers being laminated on a metal plate; connector terminals that is made of an electrically conductive material and is arranged in a peripheral portion of the metal substrate; and metal elements that have one end portions welded to the conductor layers of the metal substrate on which the power main body is mounted, and the other end portions welded to the connector terminals.

According to the electric power steering apparatus of the present invention, there can be achieved the following advantageous effects. That is, the size and cost of the apparatus can be reduced, and the reliability of electrical connections between the control unit and the electric motor.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. In individual embodiments, the same or corresponding members or parts are identified by the same reference numerals or characters.

Embodiment 1

Figure 1:
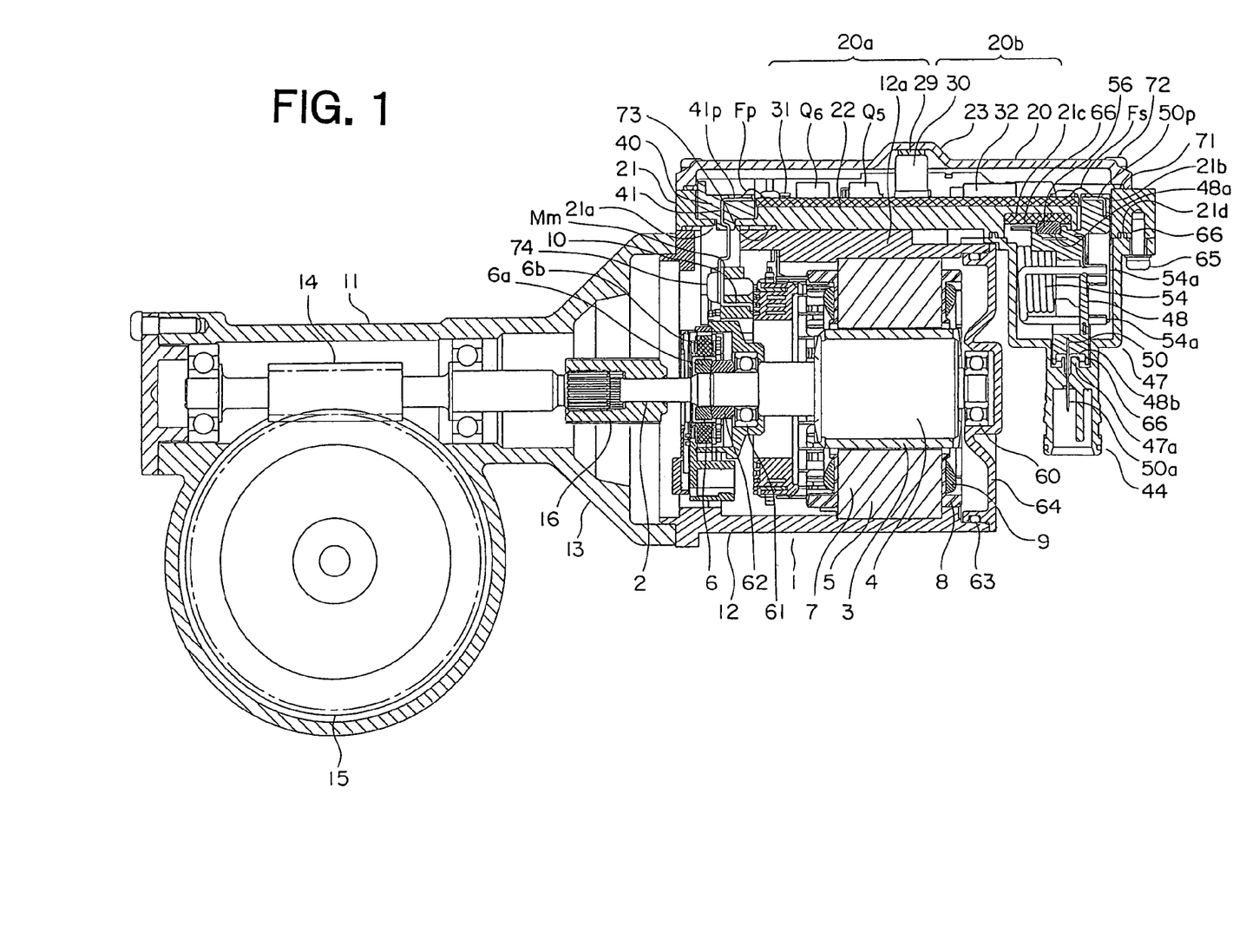
FIG. 1 is a cross sectional view showing an electric power steering apparatus according to a first embodiment of the present invention.
Figure 2:
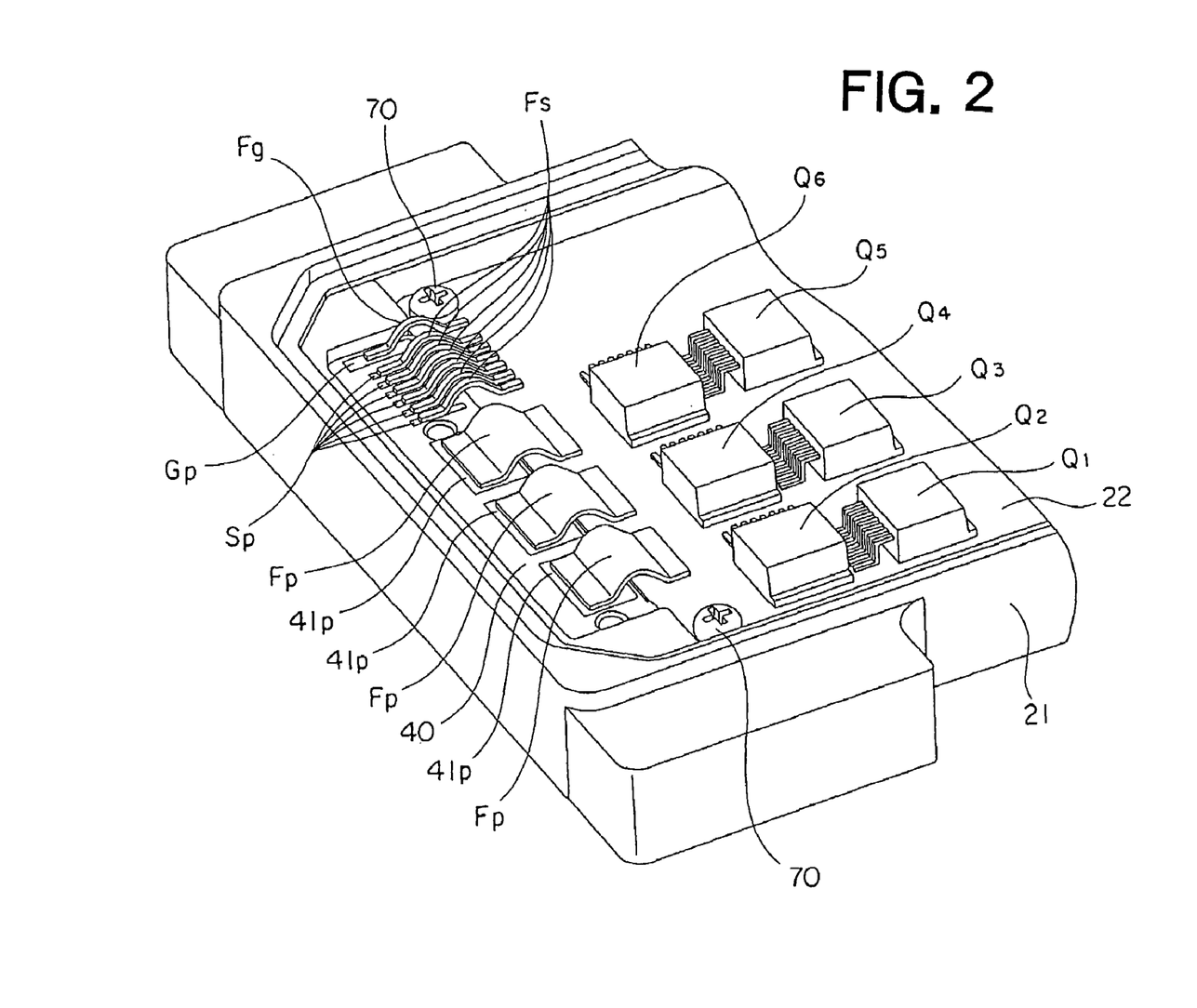
FIG. 2 is a perspective view showing a part of the interior of the electric power steering apparatus in FIG. 1.

FIG. 1 is a cross sectional view that shows an electric power steering apparatus according to a first embodiment of the present invention, and FIG. 2 is a perspective view that shows a part of the interior of the electric power steering apparatus in FIG. 1.

In these figures, an electric motor 1 in the form of a three-phase blushless motor of this electric power steering apparatus is provided with an output shaft 2, a rotor 4 with a permanent magnet 3 having eight magnetic poles fixedly attached to the output shaft 2, a stator 5 arranged around the rotor 4, and a rotational position sensor 6 arranged at an output side of the output shaft 2 for detecting the rotational position of the rotor 4.

The stator 5 has twelve salient poles 7 arranged in opposition to the outer periphery of the permanent magnet 3, insulators 8 attached to these salient poles 7, respectively, and armature windings 9 wound around the insulator 8 and connected with three-phases U, V and W. The armature windings 9 have their three end portions connected with three winding terminals 10, respectively, extending in an axial direction at the output side of the output shaft 2.

The rotational position sensor 6 is composed of a resolver, and has a resolver rotor 6a and a resolver stator 6b. The outside diameter or contour of the resolver rotor 6a is formed into a special curve so that the permeance of a diametral clearance or gap between the reservoir stator 6b and the resolver rotor 6a changes in a sinusoidal manner at a relative angle therebetween. An exciting coil and two sets of output coils are wound around the resolver stator 6b for detecting a change in the diametral gap between the resolver rotor 6a and the resolver stator 6b to generate two-phase output voltages that change in a sine wave and in a cosine wave, respectively.

The electric motor 1 is fixedly attached to a speed reduction mechanism in the form of a reduction gear 11. The reduction gear 11 includes a gear case 13 to which a housing 12 of the electric motor 1 is attached, a worm gear 14 that is arranged in the gear case 13 for decelerating the rotation of the output shaft 2, and a worm wheel 15 that is in meshing engagement with the worm gear 14. The worm gear 14 is formed, at an end portion thereof near the electric motor 1, with a spline. A coupling 16 with a spline formed on its inner side is press-fitted into an end portion of the output shaft 2 near the reduction gear 11. Thus, the coupling 16 and the one end portion of the worm gear 14 are coupled with each other through their splines, so that torque can be transmitted from the electric motor 1 to the reduction gear 11 through the coupling 16.

The control unit 20 for controlling the driving of the electric motor 1 is fixedly secured to a bracket 12a that is formed at an upper portion of the housing 12 of the electric motor 1. The control unit 20 includes a heat sink 21 that is in the shape of a box and is made of aluminum of high conductivity, a metal substrate 22 arranged in the heat sink 21, a cover 23 made of aluminum that cooperates with the heat sink 21 to receive the metal substrate 22, etc., in its interior, and a connector 44. The heat sink 21, the metal substrate 22 and the cover 23 are arranged in parallel to the axial direction of the electric motor 1.

On the metal substrate 22, there are mounted a power main body 20a at the output side (i.e., at the side near the gear case 13) of the electric motor 1, and a control main body 20b at the opposite side thereof (i.e., at the side remote from the gear case 13), as shown in FIG. 1. The power main body 20a is comprised of high current parts such as semiconductor switching elements (e.g., FET) Q1 through Q6 that constitutes a three-phase bridge circuit for switching a motor current of the electric motor 1, capacitors 30 that absorb ripples of the motor current, a shunt resistor 31 that detects the current of the electric motor 1, and so on. A thermal conductive sheet 29 having high conductivity and excellent flexibility is fitted between the upper surface of each capacitor 30 and the inner wall surface of the cover 23.

The control main body 20b is composed of low current parts such as a microcomputer 32, a drive circuit (not shown), a peripheral circuit element including a motor current detection circuit (not shown) and so on. The microcomputer 32 calculates an assist torque based on the motor current, which flows into the motor 1 through one end of the shunt resistor 31 and is detected by the motor current detection circuit (not shown), and a steering torque signal from a torque sensor (not shown), and calculates a current corresponding to the assist torque by feeding back the motor current and the rotational position of the rotor 4 detected by the rotational position sensor 6. Then, the microcomputer 32 outputs drive signals to control the semiconductor switching elements Q1 through Q6 of the bridge circuit.

In addition, the microcomputer 32 includes, though not illustrated, a well-known self-diagnosis function in addition to an AD converter, a PWM timer circuit, etc., and always carries out self-diagnosis so as to determine whether the system operates normally, whereby it can interrupt the motor current upon occurrence of abnormality.

Figure 3:
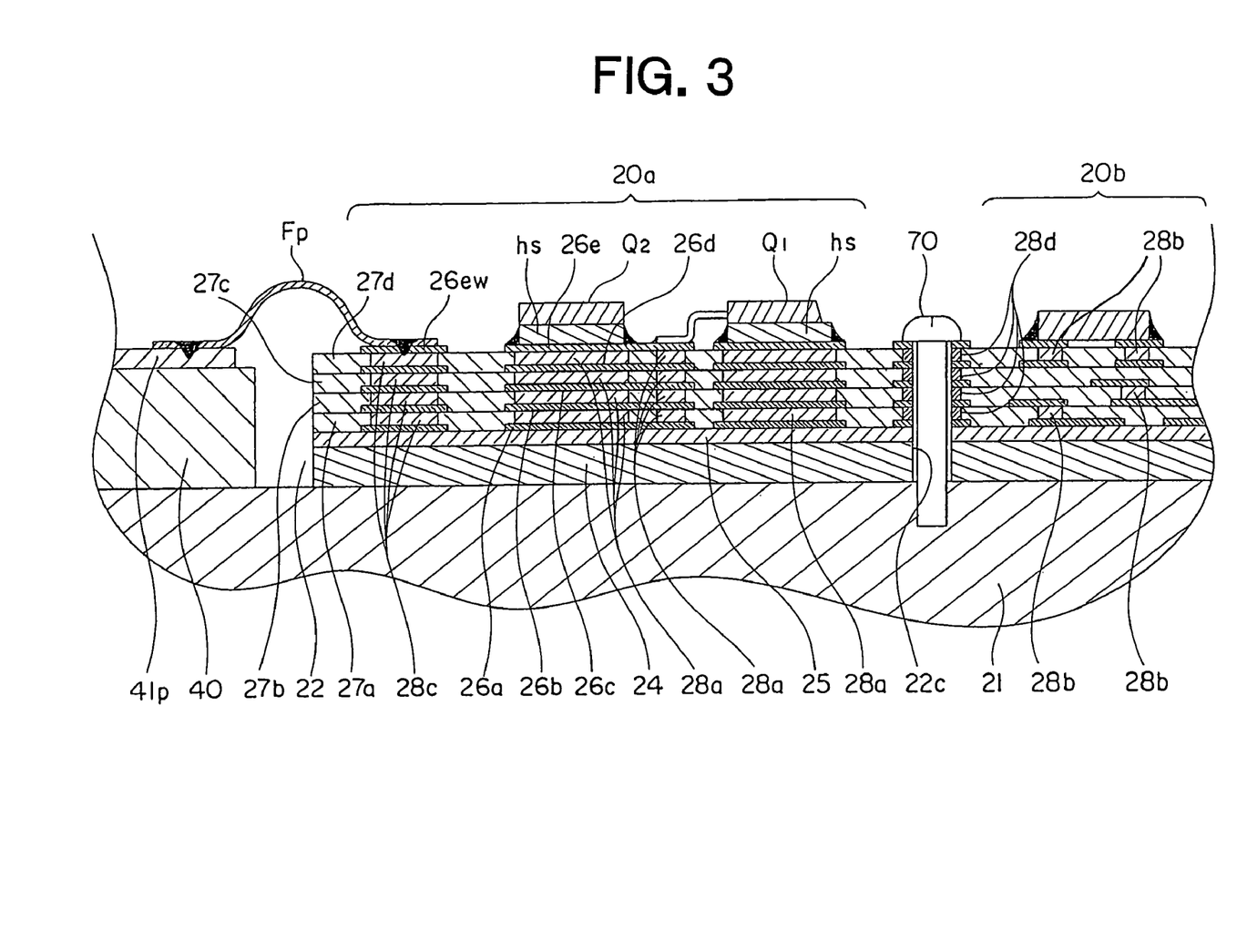
FIG. 3 is a partial cross sectional view showing a metal board of the electric power steering apparatus in FIG. 1.

FIG. 3 is a cross sectional view of essential portions of the metal substrate 22. The metal substrate 22 is composed, for instance, of an AGSP (a registered trademark of Daiwa Co., Ltd.) substrate, with a wiring pattern 26a being formed on a metal plate 24 made of aluminum of 2 mm thick as a copper pattern of 35 μm thick through a heat dissipation insulating layer 25 of 80 μm thick. On the metal plate, four interlayer insulating layers 27a, 27b, 27c, 27d each of 60 μm thick, and four wiring patterns 26b, 26c, 26d, 26e made of copper of 35 μm thick are laminated, respectively, one over another in an alternate manner. Thus, the wiring patterns 26a through 26e are composed of five conductor layers.

On the wiring pattern 26e in the form of the top or uppermost layer of the metal substrate 22, there are mounted by soldering a plurality of high current parts such as the semiconductor switching elements Q1 through Q6, etc., and a plurality of low current parts such as the microcomputer 32, etc.

Between the adjacent conductor layers of the wiring patterns 26a through 26e arranged in opposition to heat dissipation plates (heat spreaders) hs of the semiconductor switching elements Q1 through Q6, there are formed power circuit metal columns 28a in a line in the thickness direction of the metal substrate 22. Also, control circuit metal columns 28b are formed between the conductor layers of the wiring patterns 26a through 26e that are arranged in opposition to the microcomputer 32.

It is necessary to pass heat and large current in the vicinity of the individual high current parts that constitute the power main body 20a, so it is desirable that the power circuit metal columns 28a each have a cross-sectional area as large as possible.

In contrast to this, in the low current parts that constitute the control main body 20b, in order to reduce the stress generated in the soldered portions of the parts due to a temperature change, it is desirable that the control circuit metal columns 28b each have a cross-sectional area as small as possible. Therefore, the cross-sectional area of each of the power circuit metal columns 28a is formed to be larger than the cross-sectional area of each of the control circuit metal columns 28b. In particular, it is preferable that each of the control circuit metal columns 28b be smaller in diameter than a circular cross-sectional area of 0.4 mm.

The power main body 20a and the control main body 20b are arranged on the single metal substrate 22, and are electrically connected to each other by means of the wiring patterns 26a through 26e, the power circuit metal columns 28a and the control circuit metal columns 28b, so that signal transmission between the control main body 20b and the power main body 20a is carried out through the wiring patterns 26a through 26e, the power circuit metal columns 28a and the control circuit metal columns 28b.

Further, only a check pattern for checking the metal substrate 22 after the component parts have been mounted thereon is formed as the wiring pattern 26e on the top layer, and the parts mounted on the metal board 22 are electrically connected to one another by four layers of wiring patterns 26a through 26d except for the uppermost wiring pattern 26e.

In the metal substrate 22, the uppermost insulating layer 27d is formed of a material whose modulus of elasticity is smaller than those of the other insulating layers 27a through 27c. The insulating layer 27d with a small modulus of elasticity serves to reduce the stress generated at soldered portions in the form of brazed portions of parts in the use environment of a motor vehicle, for example due to a temperature change between −40° C. and 125° C., thereby improving the reliability of bonding or connection of the soldered portions of the parts.

In addition, in the metal board 22, neither any power circuit metal columns 28a nor any control circuit metal columns 28b are arranged in the heat dissipation insulating layer 25, so it is necessary for the heat dissipation insulating layer 25 itself to radiate heat. Thus, the heat dissipation insulating layer 25 is made of a material which is larger in thermal conductivity than the insulating layers 27a through 27d.

Here, note that each of the power circuit metal columns 28a may be divided into a plurality of subcolumns each having a circular cross section. In addition, if the thermal resistance of the capacitors 30 permits, the thermal conductive sheet 29 may be omitted.

As shown in FIG. 3, on the uppermost wiring pattern 26e in the peripheral portion of the metal substrate 22, there are formed welding pad portions 26ew to each of which one end portion of a corresponding power metal element Fp made of copper of 100 μm thick is welded. Each welding pad portion 26ew has a lower surface connected to an upper surface of the second uppermost wiring pattern 26d by a wire metal column 28c. Further, welding metal columns 28c are arranged in a line in the thickness direction of the metal substrate 22 between the adjacent conductor layers of the wiring patterns 26a through 26d.

In order to increase the welding or penetration depth (fused or melted portions) upon welding of each power metal element Fp and a corresponding welding pad portion 26ew, a welding metal column 28c is arranged between the lower surface of the welding pad portion 26ew and the upper surface of the second uppermost wiring pattern 26d.

Each power metal element Fp has one end thereof connected with a corresponding welding pad portion 26ew by laser welding, whereby the one end portion of the power metal element Fp, the corresponding welding metal column 28c and the corresponding welding pad portion 26ew are fused or melted and bonded to one another. Here, note that the laser welding of each power metal element Fp made of copper can be carried out, for example, by means of a green laser welder using a YAG second harmonic (an oscillation wavelength being 532 nanometers) of MIYACHI CORPORATION. In addition, if the wavelength of a laser beam is 532 nanometers or below with which copper has a small reflection, the welding of copper members can be easily carried out by means of the laser welder.

As shown in FIG. 3, the metal substrate 22 has holes 22c formed therethrough in the peripheral portion thereof, and the metal substrate 22 is fixedly secured to the heat sink 21 by means of screws 70 threaded into these holes 22c. Around each hole 22c, there are arranged a plurality of fixing metal columns 28d, which are disposed between adjacent layers of the wiring patterns 26a through 26e in a line in the thickness direction of the metal substrate 22. The fixing metal columns 28d are arranged under a bearing surface of the head of each screw 70, so that a force generated by tightening of the screw 70 is applied to the fixed metal columns 28d.

Although the metal plate 24 is made of aluminum in this embodiment, an AlSiC material may be used in which silicon carbide particles are dispersed in an aluminum material. The AlSiC material is higher in cost than aluminum but has a rigidity greater than that, so the thickness of the metal plate 24 can be made thinner than that of an aluminum plate, but it is preferable to select the thickness in a range substantially between 1.4 mm and 1.6 mm.

Further, the AlSiC material is smaller in the coefficient of thermal expansion than aluminum, and hence the reliability of solder bonding or joint of the parts mounted on the metal substrate 22 by soldering can be improved. In case where the AlSiC material is used for the metal plate 24, it is preferable that an AlSiC material having a similar coefficient of thermal expansion be used for the heat sink 21.

A frame 40 having a conductive plate 41 insert molded into an insulating resin is arranged at one side of the metal substrate 22, and the conductive plate 41 is formed at one end thereof exposed from the insulating resin with motor terminals Mm. The motor terminals Mm are protruded from corresponding holes 21a formed in the heat sink 21, so that they are inserted into the electric motor 1 and electrically connected with the winding terminals 10 by means of screws 74, respectively.

The conductive plate 41 is formed at the other end thereof exposed from the insulating resin with motor pad portions 41p in the form of connector terminals. Each power metal element Fp has the other end thereof welded with a corresponding motor pad portion 41p by laser welding. Accordingly, the power main body 20a having the bridge circuit is electrically connected to the electric motor 1 through the power metal elements Fp.

As shown in FIG. 2, the power metal elements Fp are three in number for example, and are arranged in a side by side relation between the metal substrate 22 and the frame 40. The individual power metal elements Fp are formed wide so as to supply large motor currents to the armature windings 9 of three phases U, V and W of the electric motor 1 via the motor terminals Mm, respectively.

In addition, the frame 40 is formed with a sensor connector (not shown) that has six sensor terminals (not shown) insert molded into an insulating resin and fitted into a connector (not shown) for the rotational position sensor 6 for sending a signal therefrom to the microcomputer 32. Each sensor terminal (not shown) is formed at its one end with a sensor pad portion Sp that is exposed from the insulating resin, similarly to the motor pad portions 41p, and each of signal metal elements Fs has one end portion thereof bonded to a corresponding sensor pad portion Sp in the form of a connector terminal by laser welding, and the other end thereof bonded to a welding pad portion of the wiring pattern 26e on the uppermost layer. Accordingly, the microcomputer 32 that constitutes the control main body 20b and the sensor terminals are electrically connected with one another through six signal metal elements Fs that are arranged in a side by side relation.

Further, the frame 40 has one ground terminal that is insert molded into an insulating resin for connecting a ground terminal (not shown) on the metal substrate 20 to the heat sink 21. The ground terminal of the frame 40 is formed at its one end with a ground pad portion Gp in the form of a connector terminal that is exposed from the insulating resin, similarly to the motor pad portions 41p and the sensor pad portions Sp. A ground metal element Fg has one end portion thereof bonded to the ground pad portion Gp by laser welding, and the other end thereof bonded to a ground terminal on the metal substrate 20.

The connector unit 44 is arranged in the vicinity of a rear end of the electric motor 1 at a side opposite to the gear case 13. The connector unit 44 includes a power connector electrically connected to a battery (not shown) of a vehicle, and a signal connector to and from which a signal from a torque sensor (not shown) and other signals are input and output to a vehicle side through external wiring. Also, the connector unit 44 is composed of a connector housing 47 and a connector frame 48 received in the connector housing 47, and is fixedly secured to the heat sink 21 at a side opposite to the metal substrate 22. The connector housing 47 includes a housing of the power connector and a housing of the signal connector which are integrally molded with an insulating resin. The connector frame 48 includes a conductive plate having a power supply pad portion (not shown) formed at its one end for supplying current to the power main body 20a of the metal substrate 22, a conductive plate having a power connector terminal formed at its one end, a plurality of conductive plates that form other wiring patterns, and a signal terminal 50 having a signal connector terminal formed at its one end and a pad portion 50p formed at its other end, these conductive plates and signal terminal being insert molded into an insulating resin.

The connector frame 48 has a power connector terminal (not shown), a signal connector terminal 50a, electrically connected portions of the conductive plates, a power supply pad portion (not shown), a signal pad portion 50p and so on exposed from the insulating resin. The signal metal elements Fs are bonded to the signal pad portion 50p and the welding pad portions 26ew on the metal substrate 20 by laser welding. Also, though not shown, the power metal elements Fp are bonded to the power supply pad portion (not shown) and the welding pad portions 26ew on the metal substrate 20 by laser welding.

Although in this embodiment, the metal elements Fp, Fs, Fg are made of copper, they may instead be made of a copper alloy of high conductivity. If the power metal elements Fp are made of copper or copper alloy of high conductivity, the electric resistance of a path in the control unit 20 through which a large current flows becomes small. In addition, even when the large current flows through the power metal elements Fp, the heat generated by the large current is conducted to the welding pad portions 26ew and the welding metal columns 28c, so the heat generation of the power metal elements Fp can be suppressed.

On the connector frame 48, there are mounted a coil 54 and a capacitor 56 that serve to prevent the electromagnetic noise generated upon the switching operation of the semiconductor switching elements Q1 through Q6 of the power main body 20a from flowing out to the outside, and they are connected to the conductive plates of the connector frame 48. The coil 54 is inserted into and held by the connector frame 48, and has its ends or terminals electrically connected by welding with conductive plates exposed from the insulating resin.

Further, the connector frame 48 is formed with a capacitor receiving portion 48a that receives the capacitor 56, and parts of a pair of conductive plates are exposed from the insulating resin at one end side of the capacitor receiving portion 48a, so that the conductive plates thus exposed are connected by welding with the opposite ends of the capacitor 56, respectively.

The connector frame 48 is also formed with a concave portion 48b into which the power connector terminal (not shown) and the signal connector terminal 50a protrude, and the connector housing 47 is formed at an entrance portion thereof with a convex portion 47a into which the power connector terminal (not shown) and the signal connector terminal 50a are inserted. An adhesive resin in the form of a silicon bonding material 66 is filled into a gap formed between the concave portion 48b and the convex portion 47a, with the connector housing 47 being completely inserted into the connector frame 48, whereby air tightness among the power connector terminal (not shown), the signal connector terminal 50a and the connector housing 47 is ensured. Here, note that the power connector terminal is not illustrated, but similar in construction to the signal connector terminal 50a shown in FIG. 1.

The heat sink 21 has a concave portion 21c formed in a portion onto which the connector frame 48 is mounted, with the concave portion 21c and the capacitor 56 being arranged in opposition to each other. The silicon bonding material 66 is filled into a gap between the concave portion 21c of the heat sink 21 and the capacitor 56, whereby the capacitor 56 is fixed to the heat sink 21. Here, note that the connector 44, the heat sink 21 and the cover 23 shown in FIG. 1 are kept inverted when the silicon bonding material 66 is filled into the gap formed between the concave portion 48b and the convex portion 47a, or when the silicon bonding material 66 is filled into the gap between the concave portion 21c and the capacitor 56.

Now, reference will be made to a procedure of assembling the electric power steering apparatus, as constructed above.

First of all, the electric motor 1 is assembled, and for this purpose, the permanent magnet 3 is fixedly bonded to the output shaft 2 and then magnetized to eight poles by a magnetizer, after which an inner race of a bearing 60 is press-fitted over the output shaft 2 to form the rotor 4.

Thereafter, the individual armature windings 9 of U, V and W phases are wound around the twelve salient poles 7, respectively, of the stator 5 through the insulators 8 at locations displaced at an electrical angle of 120 degrees apart from one another, so that four windings are formed for each of U, V and W phases, thus providing a total of twelve windings. The respective U-phase winding portions have their winding-start ends and winding-termination ends connected with one another to form an entire U-phase armature winding, and the V-phase and W-phase armature windings are also formed in the same manner. After formation of the armature windings of the U, V and W phases, the winding-termination ends thereof are mutually connected with one another to provide a neutral point, whereas the winding-start ends of the armature windings of the U, V and W phases are connected with the winding terminals 10, respectively. Thereafter, the stator 5 with the windings thus formed is inserted into and fixed to the housing 12.

Subsequently, after an outer race of a bearing 61 is fixedly attached to the housing 12, the stator 6b of the rotational position sensor 6 is fixedly attached to the housing 12. Then, the output shaft 2 of the rotor 4 is inserted into an inner race of the bearing 61. After a spacer 62 is press-fitted over the output shaft 2, the output shaft 2 is fixed to the inner race of the bearing 61. Further, the rotor 6a of the rotational position sensor 6 and the coupling 16 are press-fitted over the output shaft 2, and an end cover 64 with a rubber ring 63 fitted thereto is inserted into the housing 12 from the rear end side of the electric motor 1 and fixedly attached to the housing 12 by means of screws (not shown).

Next, reference will be made to a procedure of assembling the control unit 20.

First of all, component parts such as the semiconductor switching elements Q1 through Q6, the capacitors 30, the shunt resistor 31, etc., which together constitute the power main body 20*a*, and component parts such as the microcomputer 32, its peripheral circuit elements, etc., which constitute the control main body 20*b*, are mounted on the metal substrate 22 with the individual electrodes being coated with a cream solder, and the cream solder is fused or melted by using a reflow device, so that the above-mentioned respective component parts are soldered to the electrodes of the metal substrate 22.

In addition, the capacitors 56 are received in the capacitor receiving portions 48*a* of the connector frame 48, and the terminals of the capacitors 56 are bonded by welding to the conductive plates exposed from the insulating resin.

Then, the coil 54 is inserted into the connector frame 48. Upon insertion of the coil 54, the terminal 54*a* is protruded from the connector frame 48 and bonded by welding to a conductive plate exposed from the insulating resin. Thereafter, the connector frame 48 with the coil 54 and the capacitors 56 connected therewith is fixedly attached to the outer side of the heat sink 21 by means of screws (not shown). The concave portion 21*c* of the heat sink 21 is arranged in opposition to the capacitors 56 connected with the connector frame 48, and the silicon bonding material 66 is filled into a groove 21*d* and the concave portion 21*c* of the heat sink 21, and the concave portion 48*b* of the connector frame 48. Then, the connector housing 47 is inserted to the connector frame 48, and fastened to the heat sink 21 by screws 65.

The silicon bonding material 66 is filled into the gap formed between the concave portion 48*b* of the connector frame 48 and the convex portion 47*a* of the connector housing 47, whereby the air tightness among the power connector terminal (not shown), the signal connector terminal 50*a* and the connector housing 47 can be ensured. Further, the silicon bonding material 66 is filled into the gap between the concave portion 21*c* of the heat sink 21 and the capacitors 56, whereby the capacitors 56 are bonded and fixed to the heat sink 21.

Then, the frame 40 is fitted into the heat sink 21 in such a manner that the motor terminals Mm and the sensor connector (not shown) are protruded from the hole 21*a* in the heat sink 21 to the outside, and the frame 40 is fixedly fastened to the inner side of the heat sink 21 by screws (not shown). Thereafter, the metal substrate 22 with parts mounted thereon is fixedly fastened to the heat sink 21 by the screws 70. Specifically, the screws 70 are inserted into the holes 22*c* that are formed in the metal substrate 22 in a total of six locations including four corners thereof and two places surrounding the power main body 20*a*, thereby fixedly fastening the metal substrate 22 to the heat sink 21. Thereafter, the power metal elements Fp and the motor pad portions 41*p* of the frame 40 are bonded to each other by laser welding, and the flexible power metal elements Fp are bent in an angled manner, as shown in FIG. 3, so that the power metal elements Fp and the welding pad portions 26*ew* of the metal substrate 22 are electrically bonded to each other by laser welding.

In addition, the laser welding of the signal metal elements Fs and the sensor pad portions Sp, the laser welding of the signal metal elements Fs and the welding pad portions 26*ew*, the laser welding of the ground metal element Fg and the ground pad portion Gp, and the laser welding of the ground metal element Fg and the welding pad portions 26*ew* are all performed in the same manner as stated above. Subsequently, the laser welding of the signal metal elements Fs and the signal pad portion 50*p* of the connector frame 48 and the laser welding of the signal metal elements Fs and the welding pad portions 26*ew* are also carried out in the same manner as stated above. Further, the laser welding of the power metal elements Fp and the power supply pad portion (not shown) of the connector frame 48 and the laser welding of the power metal elements Fp and the welding pad portions 26*ew* are carried out similarly in the above manner. Here, note that the purpose of bending the metal elements Fp, Fs, Fg in an angled manner is to prevent an excessively large heat stress from being applied to the laser-welded portions due to a change in temperature of the apparatus. Then, the cover 23 with a precoat gasket 71 coated thereon and solidified beforehand is arranged at an opening portion of the heat sink 21, and fixedly fastened to the heat sink 21 by screws 72.

Subsequently, the electric motor 1 and the control unit 20 separately assembled in the above manner are assembled with each other. A precoat gasket 73 is coated and solidified beforehand on the outside of the heat sink 21 of the control unit 20, and the control unit 20 is fixedly attached to the bracket 12*a* of the electric motor 1 by means of screws (not shown). At this time, the mating surfaces of the electric motor 1 and the control unit 20 are sealed by the precoat gasket 73.

Then, the winding terminals 10 of the electric motor 1 and the motor terminals Mm of the control unit 20 are fixed to each other by screws 74 whereby they are electrically connected with each other. Finally, the connector (not shown) from the rotational position sensor 6 of the electric motor 1 is fitted to a sensor connector (not shown) of the control unit 20 to provide electrical connection therebetween, and the assembly of the electric power steering apparatus is completed.

As described in the foregoing, according to the electric power steering apparatus of this first embodiment, the power main body 20*a* and the control main body 20*b* are mounted on the metal substrate 22, and the power main body 20*a* and the control main body 20*b* are electrically connected to each other by the wiring patterns 26*a* through 26*e* on the metal substrate 22, the power circuit metal columns 28*a* and the control circuit metal columns 28*b*. As a result, no external connection member connecting between the power main body 20*a* and the control main body 20*b* is required, so the apparatus can be reduced in size and cost, and the reliability of bonding or connection between the power main body 20*a* and the control main body 20*b* can be improved.

In addition, the power circuit is constructed by electrically connecting the power main body 20*a* and the multilayer wiring patterns 26*a*, 26*b*, 26*c*, 26*d*, 26*e* with one another, so the length of an electric path through which current flows is decreased, thereby making it possible to reduce electric power loss, and to suppress the generation of electromagnetic noise.

Moreover, between the adjacent layers of the wiring patterns 26*a* through 26*e* in regions where at least semiconductor switching elements Q1 through Q6 are mounted on the metal substrate 22, in particular in areas opposing to the heat dissipation plates (heat spreaders) hs of the semiconductor switching elements Q1 through Q6, there are formed the power circuit metal columns 28*a* in a line in the thickness direction of the metal substrate 22. As a result, the heat generated by semiconductor switching elements Q1 through Q6 is conducted to the metal plate 24 in a rectilinear manner, so the heat dissipation of the metal substrate 22 can be improved.

Further, the cross sectional area of each of the power circuit metal columns 28*a*, on which high current parts such as semiconductor switching elements Q1 through Q6, etc., are mounted, is formed to be larger than the cross sectional area of each of the control circuit metal columns 28*b* for small current. Consequently, the heat and large current of the power main body 20*a* can be passed through the power circuit metal columns 28*a*, and the stress generated in the soldered portions of the low current parts of the control main body 20*b* resulting from a temperature change in the environment in which the apparatus is installed can be reduced, thus making it possible to improve the performance, the thermal resistance and the durability of the apparatus.

In addition, each of the control circuit metal columns 28b is formed to have a circular shape with a diameter of 0.4 mm or less in cross section, whereby the stress generated in the soldered portions of the component parts of the control main body 20b by a temperature change therein can be reduced, thus making it possible to improve the performance, the thermal resistance and the durability of the apparatus.

Moreover, in the metal substrate 22, the wiring patterns 26a through 26e are composed of five conductor layers, and any wiring pattern other than a check pattern for checking the metal substrate 22 after the component parts has been mounted thereon is not formed in the top or uppermost wiring pattern 26e, with the wiring patterns being mainly formed in four layers from the second uppermost layer to the lowermost or bottom fifth layer. Accordingly, wiring pattern components formed in the wiring pattern 26e on the top or uppermost layer can be decreased, and hence the outside dimensions of the metal substrate 22 can be made smaller, thus making it possible to reduce the size of the apparatus.

Further, in the metal substrate 22, the uppermost insulating layer 27d is formed of a material whose modulus of elasticity is smaller than those of the other insulating layers 27a through 27c. Thus, the stress generated in the soldered portions of parts due to a temperature change can be reduced by the insulating layer 27d having a small modulus of elasticity, so the thermal resistance and the durability of the apparatus can be improved.

Furthermore, in the metal substrate 22, the heat dissipation insulating layer 25 on the metal plate 24 is formed of a material that is larger in thermal conductivity than the insulating layers 27a through 27d. Thus, the heat generated in the heat-generating parts such as the semiconductor switching elements Q1 through Q6, etc., can be conducted to the metal plate 24 with a smaller thermal resistance, so the heat dissipation of the metal substrate 22 can be improved.

In addition, the metal substrate 22 has the holes 22c formed therein for fixed attachment thereof to the heat sink 21, and around each hole 22c, there are arranged the plurality of fixing metal columns 28d, which are disposed between adjacent layers of the wiring patterns 26a through 26e on individual lines in the thickness direction of the metal substrate 22. Accordingly, the tightening force of each screw 70, being passed through a corresponding hole 22c and threaded into the heat sink 21, is transmitted from the bearing surface of its head to the fixing metal columns 28d, and hence there exists only the heat dissipation insulating layer 25 as a resin layer between the head of the screw 70 and the heat sink 21, as a result of which the screw 70 becomes difficult to loose, and the metal substrate 22 can be made in intimate contact with the heat sink 21, thus making it possible to improve the thermal resistance and the durability of the apparatus. Also, the heat generated by heat-generating parts on the metal substrate 22 is efficiently conducted to the housing 12 of the electric motor 1 via the heat sink 21.

One end portions of the power metal elements Fp and the motor pad portions 41p of the frame 40 are bonded to each other by laser welding, and the other end portions of the power metal elements Fp and the welding pad portions 26ew, which are the metal substrate side welding pad portions of the metal substrate 22, are bonded to each other by laser welding, whereby the motor pad portions 41p and the welding pad portions 26ew are electrically connected to each other through the power metal elements Fp. As a result, the power metal elements Fp, the motor pad portions 41p, the power metal elements Fp and the welding pad portion 26ew are respectively fused or melted and bonded to one another, whereby the reliability of bonding can be improved.

Moreover, the sensor pad portions Sp of the frame 40 and the welding pad portions 26ew of the metal substrate 22, the ground pad portion Gp and the welding pad portions 26ew of the metal substrate 22, the signal pad portion 50p of the connector frame 48 and the welding pad portions 26ew of the metal substrate 22, and the power supply pad portion (not shown) of the connector frame 48 and the welding pad portions 26ew of the metal substrate 22 are electrically connected to one another by means of the metal elements Fs, Fg, Fp through mutual fusion bonding by laser welding, as in the case of the power metal elements Fp, whereby the reliability of bonding can be improved.

Further, on the top or uppermost wiring pattern 26e of the metal substrate 22, there are formed welding pad portions 26ew to which the metal elements Fp, Fs, Fg are welded, and a lower surface of each welding pad portion 26ew and an upper surface of the second uppermost wiring pattern 26d are connected to each other by means of a corresponding welding metal column 28c, and the areas of welding between the metal elements Fp, Fs, Fg and the welding pad portions 26ew are located in opposition to the welding metal columns 28c. Accordingly, the penetration depth (fused or melted portions) upon welding of the metal elements Fp, Fs, Fg and the welding pad portions 26ew can be increased, so the reliability of bonding by welding can be improved.

Since the welding of the metal elements Fp, Fs, Fg and the welding pad portions 26ew is performed by laser welding, heat during welding can be concentrated onto the welded portions, so the influence of the heat on the insulating layers 27a through 27d can be reduced, thereby making it possible to improve the reliability of bonding by the welding.

In addition, since the laser welding of the metal elements Fp, Fs, Fg and the welding pad portions 26ew is carried out by means of YAG welding using a wavelength of 532 nanometers or below, the reflection of a laser beam against copper is decreased, so the welding of these elements and portions made of copper can be carried out easily, and the reliability of bonding by the welding can be improved.

Moreover, since the power metal elements Fp are made of copper or a copper alloy of high conductivity, the electric resistance of the interior of the control unit 20 becomes small, so electric power loss can be reduced.

Also, even when a large current flows through the power metal elements Fp, the heat generated by the large current is conducted to the welding pad portion 26ew and the welding metal columns 28c, so the heat generation of the power metal elements Fp can be suppressed, thereby making it possible to improve the thermal resistance of the control unit 20.

Further, the metal plate 24 of the metal substrate 22 is made of aluminum, and the heat sink 21 is similarly made of aluminum, too, so the heat generated by the heat-generating parts on the metal substrate 22 is efficiently conducted to the housing 12 of the electric motor 1 through the metal plate 24 and the heat sink 21. Accordingly, the temperature rise of the heat-generating parts on the metal substrate 22 can be suppressed, and the thermal resistance and the durability of the control unit 20 can be improved. Additionally, the coefficient of linear thermal expansion of the metal substrate 22 and that of the heat sink 21 become substantially the same, so the distances between the motor pad portions 41p, the sensor pad portions Sp, the ground pad portion Gp, the power pad portion (not shown) and the signal pad portion 50p fixedly attached to the heat sink 21 and the welding pad portions 26ew on the metal substrate 22 become less prone to be changed due to a temperature change. Accordingly, the forces applied to the metal elements Fp, Fs, Fg that connect these pad portions 41p, Sp, Gp, 50p and 26ew are decreased, and the reliability of the connection portions or junctions electrically connecting between these pad portions can be improved.

In addition, the metal substrate 22 is fixedly attached to the heat sink 21 by means of the screws 70 at a total of six locations including four corners thereof and two places intermediate between the power main body 20a of the metal substrate 22 and the control main body 20b, and the power main body 20a is fixedly attached in the vicinity of its periphery to the heat sink 21, so the heat generated by the heat-generating parts on the power main body 20a is efficiently conducted to the housing 12 of the electric motor 1 through the metal plate 24 and the heat sink 21 that is in intimate contact with the metal plate 24. Accordingly, the temperature rise of the heat-generating parts on the power main body 20a can be suppressed, and the thermal resistance and the durability of the control unit 20 can be improved.

Moreover, the metal substrate 22 is arranged in parallel to the axis of the electric motor 1, and at the same time, the power main body 20a is arranged at an output side of the electric motor 1 (near the gear case 13) and the control main body 20b is arranged at the opposite side thereof, so the heat generated from the power main body 20a is radiated to the gear case 13 through the heat sink 21 and the bracket 12a of the electric motor 1. Accordingly, the temperature rise of the heat-generating parts on the metal substrate 22 can be suppressed, and the thermal resistance and the durability of the control unit 20 can be improved.

Further, the connector 44 is composed of the connector frame 48 with the plurality of conductive plates forming a wiring pattern being insert molded therein, and the connector housing 47 with the connector frame 48 being received therein, and the coil 54 and the capacitors 56 for preventing the external leakage of noise generated upon switching of the semiconductor switching elements Q1 through Q6 are connected to a conductive plate that is formed at its one end with the power connector terminal. Accordingly, the length of the electric path through which current flows is decreased, thereby making it possible to reduce electric power loss, and to suppress the generation of electromagnetic noise.

Also, since the coil 54 and the capacitors 56 are received in the connector housing 47, the reduction in size of the apparatus can be made. In addition, the connector unit 44 is composed of the connector housing 47 and the connector frame 48 received in the connector housing 47, and is fixedly secured to the heat sink 21 at a side opposite to the metal substrate 22. As a result, the overall length of the control unit 20 can be shortened, and the size of the apparatus can be decreased.

Since the connector 44 is arranged at an opposite side of the control main body 20b on the metal substrate 22 with the heat sink 21 being sandwiched therebetween, the distance or length between the signal connector terminal 50a and the signal pad portion 50p is shortened, so the material used by the signal terminal 50 can be decreased and the cost thereof can also be reduced.

Furthermore, the connector 44 is arranged in the vicinity of the rear end of electric motor 1, i.e., at a side thereof opposite to its output side, so a space at the rear end of the electric motor 1 that is shorter than the control unit 20 can be effectively used, and the projected area of the apparatus when viewed from above does not increase, thus making it possible to reduce the size of the apparatus.

In addition, since the connector 44 has the power connector and the signal connector formed into the same or integral connector housing 47 and connector frame 48, the number of parts can be reduced, and hence the cost and size of the apparatus can also be reduced.

Moreover, the connector frame 48 has the concave portion 48b formed in a portion thereof into which the power connector terminal (not shown) and the signal connector terminal 50a protrude, and at the same time, the connector housing 47 has the convex portion 47a formed at an entrance portion thereof into which the power connector terminal (not shown) and the signal connector 50a are inserted, so that the silicon bonding material 66 is filled into the gap formed between the concave portion 48b and the convex portion 47a with the connector housing 47 being completely inserted into the connector frame 48. Accordingly, the air tightness of the power connector terminal (not shown) and the signal connector terminal 50a with respect to the connector housing 47 can be ensured by the silicon bonding material 66, and the water tightness of the apparatus can be improved.

Further, the heat sink 21 has the concave portion 21c formed in a portion thereof on which the connector frame 48 is mounted, and at the same time, the concave portion 21c and the capacitors 56 on the connector frame 48 are arranged in opposition to each other, with the silicon bonding material 66 being filled into the gap between the concave portion 21c of the heat sink 21 and the capacitors 56. As a result, the capacitors 56 are fixedly secured to the heat sink 21 through the silicon bonding material 66, whereby the vibration resistance of the apparatus can be improved.

Furthermore, the thermal conductive sheet 29 in the form of a heat dissipation material having high thermal conductivity and excellent flexibility is fitted between the upper surface of each capacitor 30, which serves to absorb current ripples, and the inner surface of the cover 23 made of aluminum. Thus, the heat generated from the capacitors 30 is radiated to the cover 23 in addition to the metal substrate 22, whereby the temperature rise of the capacitors 30 can be suppressed, and the durability of the capacitors 30 can be improved. Also, since the thermal conductive sheet 29 having excellent flexibility is fitted between the upper surface of each capacitor 30 and the inner surface of the cover 23, the vibration of the upper portions of the capacitors 30 can be suppressed, whereby the vibration resistance of the apparatus can be improved, thus enhancing the reliability thereof.

Embodiment 2

Figure 4:
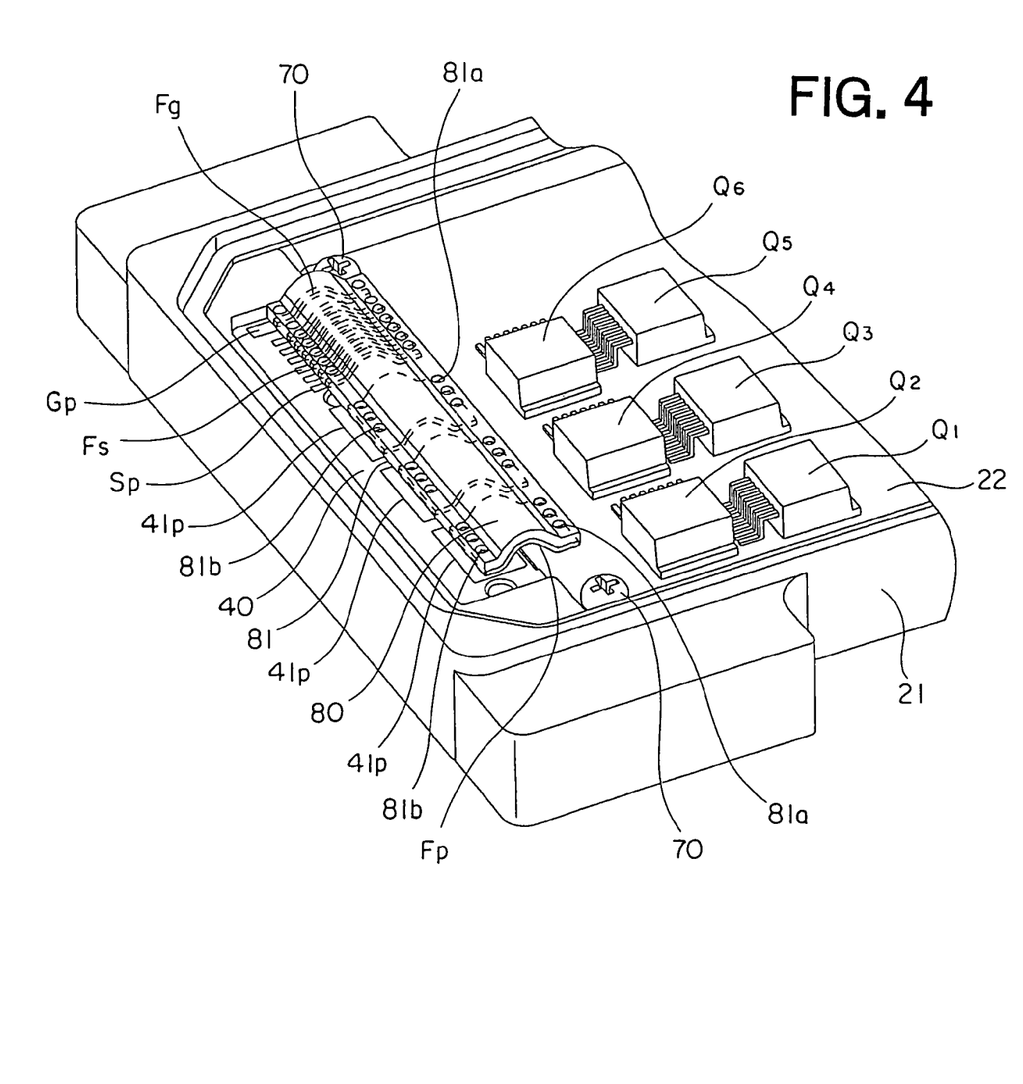
FIG. 4 is a cross sectional view showing a part of the interior of an electric power steering apparatus according to a second embodiment of the present invention.
Figure 5:
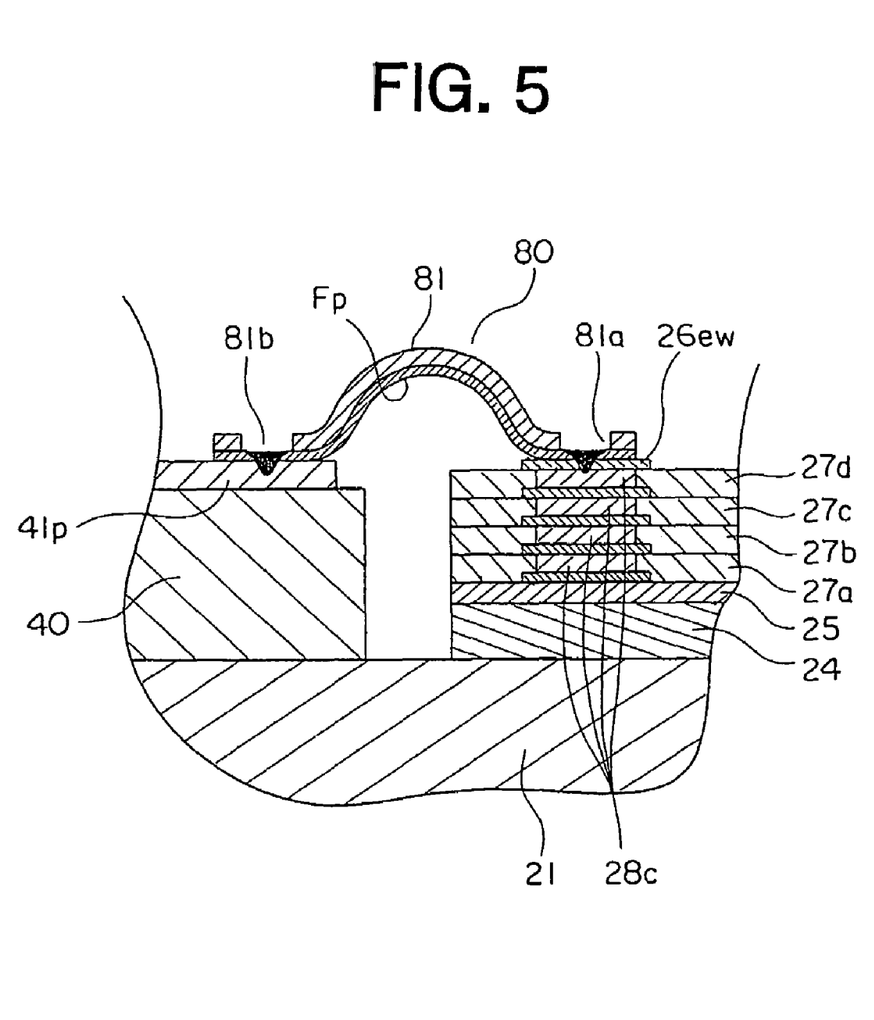
FIG. 5 is a partial cross sectional view showing a metal board of the electric power steering apparatus in FIG. 4.

FIG. 4 is a cross sectional view that shows part of the interior of an electric power steering apparatus according to a second embodiment of the present invention, and FIG. 5 is a cross sectional view of essential portions of a control unit 20 of FIG. 4.

In this embodiment, metal elements Fp, Fs, Fg are arranged in a side by side relation and mounted on one side surface of an insulation sheet 81 having flexibility and high thermal conductivity. Specifically, three power metal elements Fp for large current are mounted on the insulation sheet 81 for supplying motor current to armature windings 9 of three phases U, V and W of an electric motor 1 via motor terminals Mm. Also, six signal metal elements Fs are mounted on the insulation sheet 81 for sending a signal from a rotational position sensor 6 of the electric motor 1 to a microcomputer 32 on the metal substrate 20 via sensor terminals (not shown). Further, one ground metal element Fg is also mounted on the insulation sheet 81 for connecting a ground terminal (not shown) on the metal substrate 20 to a heat sink 21. Thus, a total of ten metal elements Fp, Fs, Fg are mounted on the insulation sheet 81.

In addition, the rectangular-shaped insulation sheet 81 has metal substrate side holes 81a formed at a side near the metal substrate 22 and connector terminal side holes 81b formed at a side near a frame 40. The metal substrate side holes 81a are formed at locations in opposition to welding pad portions 26ew formed on a top or uppermost wiring pattern 26e. The connector terminal side holes 81b are formed at locations in opposition to motor pad portions 41p, sensor pad portions Sp, and ground pad portion Gp, respectively.

Thus, in this embodiment, the control unit 20 and the electric motor 1 are electrically connected to each other by a connecting member 80 that is composed of the insulation sheet 81 and the metal elements Fp, Fs, Fg. The other construction of the second embodiment is similar to that of the electric power steering apparatus of the first embodiment.

In the assembly procedure of this second embodiment, the processes up to the assembly of the electric motor 1 and the assembling step of fixedly attaching the metal substrate 22 to the heat sink 21 in the control unit 20 are similar to those of the first embodiment.

After this, in this embodiment, the connecting member 80 before the holes 81a, 81b are formed is arranged under deflection deformation on the frame 40 and the metal substrate 22. Then, the holes 81a, 81b are formed through the insulation sheet 81 by means of a laser device that is different from the one used for the welding of copper.

Thereafter, a laser beam of a laser welder for copper welding is irradiated to the surfaces of the metal elements Fp, Fs, Fg at locations at which the holes 81b are formed, so that electrical connections or bondings between the power metal elements Fp and the motor pad portions 41p, between the signal metal elements Fs and the sensor pad portions Sp, and between the ground metal element Fg and the ground pad portion Gp are respectively carried out by laser welding.

Similarly, a laser beam of the laser welder for copper welding is irradiated to the surfaces of the metal elements Fp, Fs, Fg at locations at which the holes 81a are formed, so that electrical connections or bondings between the power metal elements Fp and the welding pad portions 26ew, between the signal metal elements Fs and the welding pad portions 26ew, and between the ground metal element Fg and the welding pad portions 26ew are respectively carried out by laser welding.

Then, in the same manner as stated above, the connection of the signal pad portion 50p of the connector frame 48 and the welding pad portions 26ew on the metal substrate 20, and the connection of the power supply pad portion (not shown) of the connector frame 48 and the welding pad portions 26ew on the metal substrate 20 are carried out by using a connecting member that has an insulation sheet and a plurality of metal elements attached thereto.

Thereafter, a cover 23 with a precoat gasket 71 coated thereon and solidified beforehand is arranged at an opening portion of the heat sink 21, and fixedly fastened to the heat sink 21 by screws 72.

Subsequently, the electric motor 1 and the control unit 20 separately assembled are assembled with each other in the same manner as stated above in the first embodiment.

Although in the above-mentioned second embodiment, the holes 81a, 81b are formed in the insulation sheet 81 by means of a laser device that is different from the one used for the welding of copper after the connecting member 80 formed in an angle shape is arranged on the frame 40 and the metal substrate 22, these holes 81a, 81b may be formed before the connecting member 80 is arranged on the frame 40 and the metal substrate 22.

In addition, the insulation sheet 81 may be made of a material with a high laser beam transmission factor while the holes 81a, 81b are not formed in the insulation sheet 81, and laser welding may be performed by focusing a laser beam directly on the welding surfaces of the metal elements Fp, Fs, Fg.

As described in the foregoing, according to the electric power steering apparatus of this second embodiment, the metal elements Fp, Fs, Fg are mounted in advance on the one side surface of the insulation sheet 81, and under such a condition, the power metal elements Fp and the motor pad portions 41p, the signal metal elements Fs and the sensor pad portions Sp, the ground metal element Fg and the ground pad portion Gp, the power metal elements Fp and the welding pad portions 26ew, the signal metal elements Fs and the welding pad portions 26ew, and the ground metal element Fg and the welding pad portions 26ew are bonded to each other by laser welding. Accordingly, in comparison with the case in which the metal elements Fp, Fs, Fg are separately and individually bonded by laser welding, the bonding operation efficiency of laser welding can be greatly improved, and workability or work efficiency can also be improved.

In addition, the insulation sheet 81 is made of an insulation material of high thermal conductivity, so even when a large current flows through the power metal elements Fp, the thermal dissipation of the heat generated by the large current can be improved, thus making it possible to improve the thermal resistance and the durability of the apparatus.

Moreover, since the connecting member 80 has the holes 81a, 81b formed therethrough at locations on which a laser beam is irradiated for welding, the laser welding operation or work becomes easy, and the improvement of workability can be made.

Here, note that in case where the insulation sheet 81 is made of a material with a high laser beam transmission factor, there is no need to form the holes 81a, 81b in the insulation sheet 81, so laser welding can be carried out by directly focusing a laser beam on the welding surfaces of the metal elements, and the laser welding operation or work becomes easy, thus making it possible to improve workability.

Further, by forming the holes 81a, 81b through the insulation sheet 81 by the use of a first laser device tha is different from the one used for the welding of copper, and by subsequently irradiating a laser beam from a second laser welder for copper welding to these holes 81a, 81b, the pad portions 41p, Sp, Gp of the frame 40 and the welding pad portions 26ew of the metal substrate 22 are electrically connected to each other. Thus, the laser drilling operation and the laser welding operation are continuously performed, so workability can be improved.

Although in the above-mentioned individual embodiments, there have been described the electric power steering apparatuses in which the power main body 20a and the control main body 20b are mounted on the metal substrate 22, the present invention can also be applied to an electric power steering apparatus in which the power main body 20a is mounted on a power board having an insulating layer and one layer of wiring pattern formed on a board main body, and in which the control main body 20b is mounted on a control board. That is, each of the power metal elements Fp may have one end portion thereof welded to the wiring pattern of the power board, and the other end portion thereof welded to the motor pad portions 41p.

Although the number of magnetic poles of the permanent magnet 3 is eight and the number of salient poles of the stator 5 is twelve, the present invention is not limited to such a combination, but any combination of the number of magnetic poles and the number of salient poles may be employed for the purpose of the invention.

Furthermore, the electric power steering apparatus is installed in an engine room, and the precoat gaskets 71, 73 are fitted and sealed by the silicon bonding material 66 so as to ensure waterproofness, but the electric power steering apparatus may instead be arranged in a passenger compartment, and in such a case, the precoat gaskets 71, 73 and the silicon bonding material 66 may be removed.

In addition, the thickness of the metal elements Fp, Fs, Fg is set to 100 μm but is not limited to such a thickness.

Also, the wiring patterns in the form of the conductor layers of the metal substrate 22 are formed of five layers, but they are not limited to such a number of layers and there can be employed other numbers of layers such as six layers, etc.

Although no wiring pattern other than a check pattern is formed as the top or uppermost wiring pattern 26e, a wiring pattern other than the check pattern may be formed within an allowable range of the outside dimensions of the metal substrate 22.

Although the axial cross section of each of the metal columns 28a, 28b, 28c, 28d is a rectangle shape, it may instead be a trapezoidal shape.

In addition, the metal plate 24 of the metal substrate 22 is made of aluminum or AlSiC material, but other metal plates such as copper may instead be used.

Although a resolver is used as the rotational position sensor 6, the present invention is not limited to the use of such a resolver, but other magnetic sensing elements such as a magneto-resistive element, a Hall element, a Hall IC or the like may instead be used.

Further, the electric motor 1 is not limited to a blushless motor, but an induction motor or a switched reluctance motor (SR motor) may instead be used.

While the invention has been described in terms of preferred embodiments, those skilled in the art will recognize that the invention can be practiced with modifications within the spirit and scope of the appended claims.

What is claimed is:

1. An electric power steering apparatus including an electric motor for outputting assist torque to a steering wheel of a vehicle, and a control unit for controlling the driving of said electric motor, said control unit comprising:

a power main body including a bridge circuit composed of a plurality of semiconductor switching elements for switching a current supplied to said electric motor in accordance with torque assisting said steering wheel;

a control main body that generates a drive signal to control said bridge circuit based on the steering torque of said steering wheel;

a metal substrate that is composed of a plurality of insulating layers and a plurality of conductor layers having wiring patterns respectively formed thereon, said insulating layers and said conductor layers being laminated on a metal plate;

connector terminals that are made of an electrically conductive material and are arranged in a peripheral portion of said metal substrate; and metal elements that have one end portions welded to said conductor layers of said metal substrate on which said power main body is mounted, and the other end portions welded to said connector terminals.

2. The electric power steering apparatus as set forth in claim 1, wherein said metal substrate is composed of said insulating layers and said conductor layers alternately laminated one over another, with adjacent ones of said conductor layers being connected with one another by metal columns.

3. The electric power steering apparatus as set forth in claim 2, wherein said metal substrate has metal substrate side welding pad portions, to which said metal elements are bonded by welding, formed on a surface of an outermost one of said conductor layers, and said metal substrate side welding pad portions and at least one of said conductor layers adjacent to said outermost conductor layer are connected to each other through welding metal columns.

4. The electric power steering control apparatus for a vehicle as set forth in claim 3, wherein said metal substrate has areas of welding between said metal elements and said metal substrate side welding pad portions located in opposition to said welding metal columns.

5. The electric power steering apparatus as set forth in claim 1, wherein said welding is laser welding.

6. The electric power steering apparatus as set forth in claim 5, wherein said laser welding is YAG welding using a wavelength of 532 nanometers or below.

7. The electric power steering apparatus as set forth in claim 1, wherein said metal elements is made of copper or a copper alloy of high conductivity.

8. The electric power steering apparatus as set forth in claim 1, wherein said plurality of metal elements are mounted in advance on one side surface of an insulation sheet.

9. The electric power steering apparatus as set forth in claim 8, wherein said insulation sheet is made of an insulation material of high thermal conductivity.

10. The electric power steering apparatus as set forth in claim 8, wherein said insulation sheet has metal substrate side holes formed at locations in opposition to said metal substrate side welding pad portions, and connector terminal side holes formed at locations in opposition to said connector terminals to which said metal elements are bonded by said welding.

11. The electric power steering apparatus as set forth in claim 8, wherein said insulation sheet is made of a material with a high laser beam transmission factor.

12. The electric power steering apparatus as set forth in claim 8, wherein said metal substrate side holes and said connector terminal side holes are formed by irradiating thereto a first laser beam, and said metal elements are welded to said the metal substrate side welding pad portions and said connector terminals by irradiating a second laser beam to said metal substrate side holes and said connector terminal side holes.

* * * * *